(No Model.)
F. HEINEMANN.
BAKING AND COOKING OVEN.
No. 569,413. Patented Oct. 13, 1896.
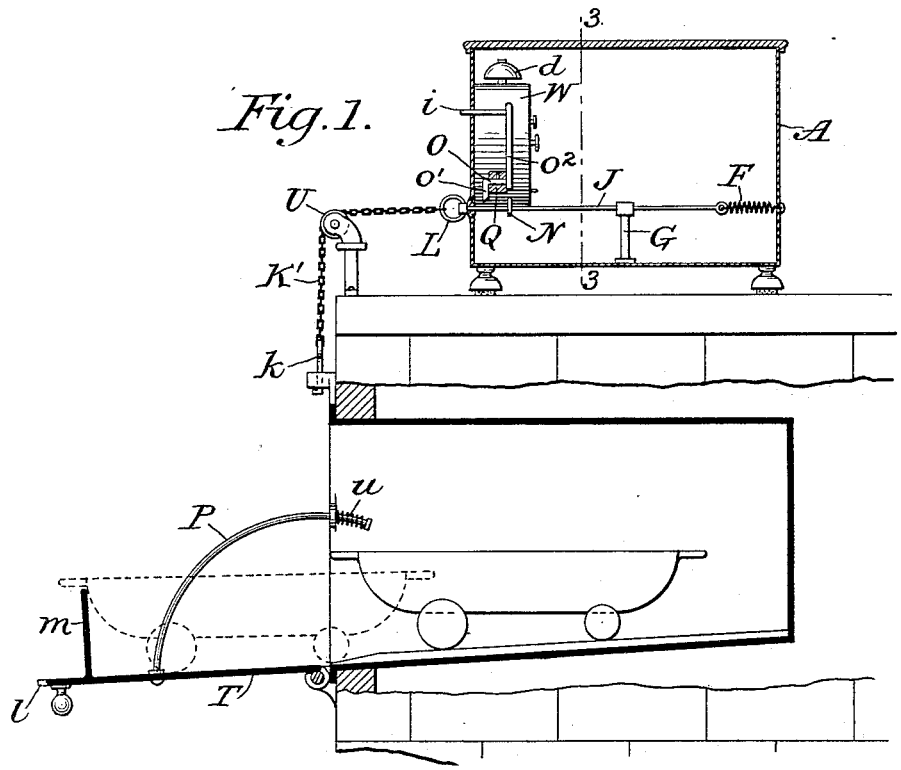
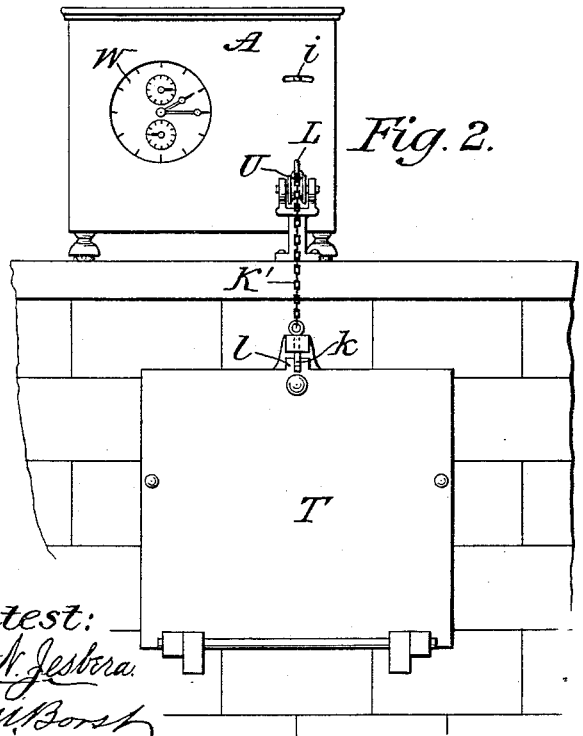
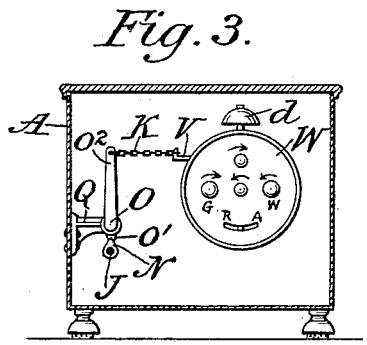
Attest:
A. N. Jesbera
G. M. Borst
Inventor:
Felix Heinemann
by Philipp Samson & Phelps
Att'ys.

UNITED STATES PATENT OFFICE.

FELIX HEINEMANN, OF CHARLOTTENBURG, GERMANY.

BAKING AND COOKING OVEN.

SPECIFICATION forming part of Letters Patent No. 569,413, dated October 13, 1896.

Application filed November 5, 1894. Serial No. 527,882. (No model.)

*To all whom it may concern:*

Be it known that I, FELIX HEINEMANN, a citizen of the free city of Hamburg, German Empire, and residing at Charlottenburg, near Berlin, in the Kingdom of Prussia, Germany, have invented new and useful Improvements in Baking and Cooking Ovens, of which the following is a specification.

My invention relates to cooking and roasting ovens, it being the object of the present invention to provide a construction of oven and to combine therewith mechanism whereby, after the lapse of a predetermined period of time, the oven-door may be released and thrown open and the utensil within the oven containing the article to be cooked or roasted delivered therefrom automatically and the cooking or roasting operation thus arrested.

To this end the invention consists in an oven having a sloping bottom and provided with a door hinged at its lower edge and provided with means for holding it in its closed position and combining therewith clock mechanism and connections whereby, after the lapse of a predetermined time, the said door will be unlocked and form a table for receiving the utensil.

In the accompanying drawings, Figure 1 is a side elevation, partly in section, of a stove or range provided with the improvements constituting the present invention. Fig. 2 is a front view of the same; and Fig. 3 is a detail in section of the clock mechanism, taken at the line 3 3 of Fig. 1.

Referring to said drawings, the stove therein illustrated is provided with an oven the bottom of which is downwardly inclined and which is provided with a door T, hinged at its lower edge and having on its inner face near the top a flange $m$. At its upper edge the door is provided with a lip $l$, which in the closed position of the door is engaged by a catch $k$, connected by a chain K', passing over a pulley U upon the top of the stove and connected at its upper end to a ring L upon the outer end of a rod J, sliding in a bracket G and passing into a casing A, containing clock mechanism for operating the catch $k$ to release the door T. At its opposite end the rod J has connected to it one end of a spring F, the opposite end of which is connected to the casing A, by which spring the rod J, when released by the clock mechanism, is moved or drawn longitudinally into the casing, the chain K' being drawn upwardly by such movement of the rod J, so as to withdraw the catch $k$ from engagement with the lip $l$. The rod J is held in its outward position by one arm, $o'$, of a lever O, which is pivoted in a bracket Q and engages a projection N upon the rod J, the other arm, $o^2$, of said lever being connected by a chain K with the hook V of an alarm-clock W, within the casing A, provided with an alarm-bell $d$. The arm $o^2$ is provided with a pin $i$, projecting outside the casing A, by which the lever O is adjusted into position for engagement with the projection N upon the rod J.

To prevent the door of the oven opening suddenly when released, it is provided with a curved rod P, entering the oven, between the inner free end of which and the front wall of the oven is interposed a spring U. An opening or housing (not shown) is preferably provided in the bottom of the oven to receive the free end of the arm P when the door is closed.

The operation is as follows: The alarm mechanism is first set for operation at a predetermined time, at the expiration of which alarm-bell $d$ rings. Hook V, through chain K, swings arm $o'$ of lever O to one side, throwing arm $o^2$ out of engagement with the projection N on rod J and permitting the latter, through spring F, chain K', and pulley U, to withdraw the catch $k$ and release the oven-door, which is then thrown open by the utensil which bears against it and which slides down the inclined bottom of the oven onto the opened door, flange $m$ on the door arresting the movement of the utensil. The door is prevented from being thrown open too abruptly by the spring $u$, which acts as a cushion.

What I claim is—

1. The combination with an oven having a sloping bottom for delivering a utensil from the oven, of a door hinged at its lower edge and adapted, when opened, to receive the utensil delivered therefrom, means for locking the oven-door and means for automatically opening the door, substantially as described.

2. The combination with an oven having a sloping bottom for delivering a utensil from the oven, of a door hinged at its lower edge, and adapted, when opened, to receive the utensil delivered therefrom, said door in its opened condition lying in the same plane with the sloping bottom of the oven, a catch for locking the oven-door and clockwork and connections for releasing said catch to open said door, substantially as described.

3. The combination with an oven having a sloping bottom for delivering a utensil from the oven, of a door hinged at its lower edge, and adapted, when opened, to receive the utensil delivered therefrom, said door in its opened condition lying in the same plane with the sloping bottom of the oven, a catch for locking the oven-door, clockwork and connections for releasing said catch to open said door, and a flange upon the inner face of said door for arresting the movement of the utensil delivered from the oven, substantially as described.

4. The combination with an oven having a sloping bottom for delivering a utensil from the oven, of a door hinged at its lower edge, and adapted, when opened, to receive the utensil delivered therefrom, said door in its opened condition lying in the same plane with the sloping bottom of the oven, a catch for locking the oven-door, clockwork and connections for releasing said catch to open said door, a flange upon the inner face of said door for arresting the movement of the utensil delivered from the oven, and a spring-cushion for said door, substantially as described.

5. The combination with an oven having a sloping bottom for delivering a utensil from the oven, of door T, flange $m$, arm P and spring $u$, catch $k$ for locking the door, chain K', rod J and spring F for releasing catch $k$, lever O engaging rod J, and clockwork for actuating said lever to release rod J, substantially as described.

In testimony whereof I have hereunto set my hand in the presence of two subscribing witnesses.

FELIX HEINEMANN.

Witnesses:
CHAS. H. DAY,
WM. HAUPT.